Jan. 10, 1961 D. E. DEUITCH 2,967,991

POWER SUPPLY

Filed Jan. 8, 1957

INVENTOR.
Don E. Deuitch

BY Morris B. Rabkin
ATTORNEY.

United States Patent Office 2,967,991
Patented Jan. 10, 1961

2,967,991

POWER SUPPLY

Don E. Deuitch, Haddon Heights, N.J., assignor to Radio Corporation of America, a corporation of Delaware Filed Jan. 8, 1957, Ser. No. 633,024

5 Claims. (Cl. 323—22)

Figure 1:
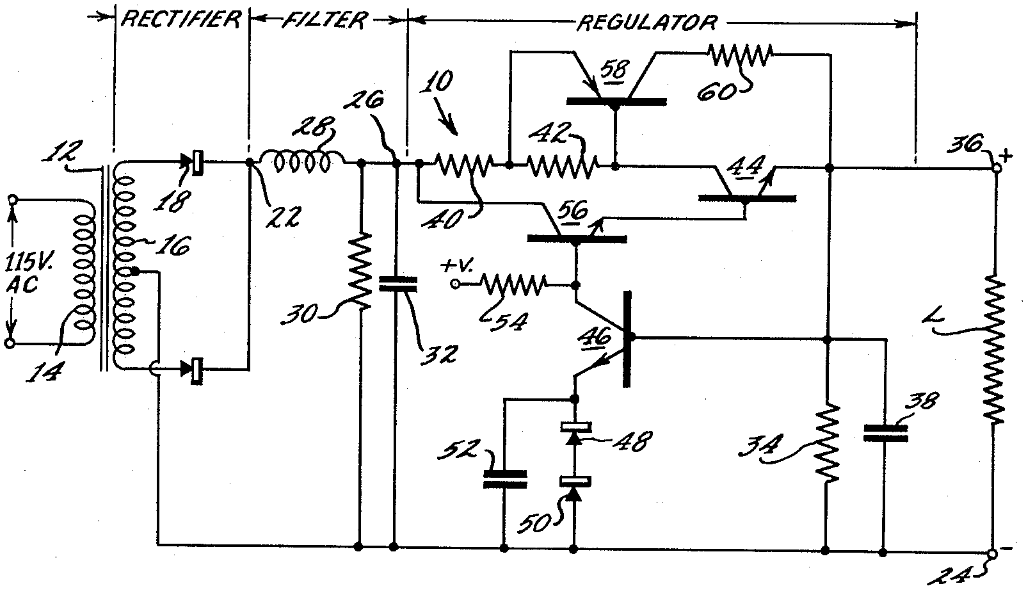

This invention relates to power supplies, and more particularly to a novel means for decreasing the power dissipated in the variable impedance device of a series regulated power supply. The present invention is particularly useful in transistorized power supplies adapted to provide a regulated output voltage over a relatively wide range of load current.

Transistors have been utilized effectively in regulated power supplies of the type wherein a transistor is used as a variable impedance between a rectified power source and a load. While good regulation is possible in such power supplies, their power-handling capacity is limited by the relatively low power capacity of available transistors. In such a power supply, for example, the transistor used as a variable impedance between the source of power and the load is continuously dissipating energy. The maximum energy that the transistor can dissipate is limited by the maximum allowable temperature of operation.

Accordingly, it is an object of the present invention to provide improved means for decreasing the power ordinarily dissipated by a transistor whereby to decrease the operating temperature of the transistor and to increase the current-handling capacity of transistorized equipment.

It is another object of the present invention to provide a transistorized power supply having improved means for reducing the maximum power normally dissipated by the regulatory, variable impendance device.

It is a further object of the present invention to provide, in a power supply, improved means to decrease the relatively large amount of the power ordinarily dissipated by the regulatory, variable impendance device under conditions of heavy load current, and to dissipate relatively little power, or none at all, under conditions of relatively light load current.

Still a further object of the present invention is to provide, in a power supply, variable means for dissipating a portion of the power normally dissipated by a regulatory variable impendance device only when the current drawn by the load is greater than a predetermined amount.

In accordance with the present invention, the foregoing objects and related advantages are attained in a novel and improved transistorized power supply of the type wherein current from a source of voltage is applied to a load though a variable impedance device, such as a series transistor. Regulation of the output voltage, is obtained by feeding back a sample of the output voltage to a control element of the series transistor to control its impedance. A first impedance, such, for example, as a resistor, is connected in series with the series transistor and the voltage source. The emitter-base path of a second transistor is connected in series with the first impedance to provide a bias for the second transistor. The collector of the second transistor is connected to one of the output terminals of the power supply through a second impedance. With this arrangement, current flowing through the series transistor also flows through the first impedance in a manner to control the conductivity of the second transistor. A portion of the load current may now flow through the second transistor and the second impedance. Thus, the second transistor and the second impedance shunt a portion of the current that would normally flow through the series transistor. For relatively low load currents, the second transistor presents a relatively high impedance, and relatively little current flows through the second transistor and second impedance. Under relatively heavy load currents, however, the second transistor is biased to saturation so that it presents a relatively low impedance. Under the latter conditions, the second impedance will dissipate the current shunted around the series transistor. In another embodiment of the present invention, a Zener diode connected in the emitter-base circuit of the second transistor sets a predetermined value of load current above which a portion of the load current will be shunted around the series transistor.

Figure 2:
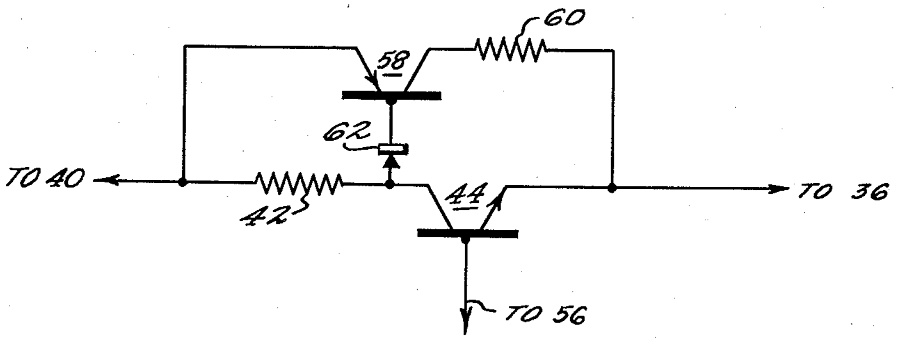

A more complete understanding of the present invention may be had by the following description when considered in connection with the accompanying drawing, in which similar reference characters represents similar components, and in which:

Fig. 1 is a schematic diagram of a power supply, regulated in accordance with the present invention; and Fig. 2 is a schematic drawing of a modification of the power supply of Fig. 1, in accordance with the present invention.

Referring now to Fig. 1, there is shown a unidirectional power supply 10, regulated in accordance with the improved power dissipating means of the present invention. The power supply 10 comprises a transformer 12 having a primary winding 14 adapted to be connected across any suitable source of alternating current (A.-C.) voltage. The secondary winding 16 of the transformer 12 has one end connected to the anode of a diode 18 and the other end connected to the anode of a diode 20. The cathodes of the diodes 18 and 29 are connected to each other and to a terminal 22. A center tap of the secondary winding 16 is connected to the negative output terminal 24 of the power supply 10. The negative output terminal 24 of the power supply 10 is a common connection, and may be grounded, if desired. However, it will be understood that teachings of the present invention may be applied to improve the performance of other power supplies, such, for example, as one employing half-wave rectification. A full wave rectified voltage appears between the terminals 22 and 24.

The terminal 22 is connected to a terminal 26 through a filter choke 28. A resistor 30 and a filter capacitor 32 are both connected between the terminals 26 and 24. It will now be understood that the filter choke 28, the resistor 30, and the filter capacitor 32 serve to filter the unregulated voltage between the terminals 22 and 24.

Means are provided to regulate the source of voltage between the terminals 26 and 24. To this end, there is provided a bleeder resistor 34 connected between the positive output terminal 36 of the power supply 10 and the negative terminal 24. A filter capacitor 38 is also connected between the output terminals 36 and 24. The terminal 26 is connected to the positive output terminal 36 through a series circuit comprising a resistor 40, an impedance 42, represented as a resistor, and a series transistor 44. The transistor 44 is of the P-type and has a collector electrode connected to the impedance 42 and an emitter electrode connected to the positive output terminal 36. The transistor 44 is a variable impedance device whose impedance is varied in response to an electrical condition, such as the voltage appearing across an associated load L connected between the output terminals 36 and 24.

Means are provided to sample the output voltage and to feed back this sample voltage degeneratively to the series transistor 44. To this end, the base of a P-type transistor 46 is connected to the resistor 34. The emitter of the transistor 46 is connected to the negative output terminal 24 through a pair of serially connected diodes 48 and 50, the latter being connected as Zener diodes. The Zener diodes 48 and 50 serve to maintain the emitter of the transistor 46 at a substantially constant voltage with respect to the negative output terminal 24. Thus, changes in the voltage at the base of the transistor 46 may be compared to the fixed voltage at the emitter of the transistor 46. The emitter of the transistor 46 is also connected to the output terminal 24 through a by-pass capacitor 52. The collector of the transistor 46 is connected to a source of operating unidirectional voltage, designated schematically as +V, through a resistor 54. The collector of the transistor 46 is also connected to the base of a transistor 56, the latter being connected as an amplifier. The collector of the transistor 56 is connected to the terminal 26, and the emitter of the transistor 56 is connected to the base of the series transistor 44. It will now be understood that an increase in the voltage between the output terminals 36 and 24, for example, because of the change in the load L or because of a surge in the unregulated input voltage, will result in applying a positive-going signal to the base of the transistor 46. More current will now flow through the transistor 46. This will result in a decrease in the current flowing through the transistor 56. Under these conditions, a negative-going voltage is applied to the base of the series transistor 44, and less current will, therefore, flow through the series transistor 44. Hence, less current is delivered to the load L between the output terminals 36 and 24. The decrease in current through the load L tends to drop the voltage between the output terminals 36 and 24 and tends to offset the original tendency of the voltage to increase. It will also be understood that a tendency for the output voltage to decrease will result in a reverse set of conditions whereby more current will flow through the series transistor 44 and increase the output voltage, thereby compensating for the tendency of the output voltage to decrease.

The amount of current that may be supplied to a load is limited by the amount of power the series transistor 44 can dissipate. The greater the current through the series transistor 44, the greater will be the rise in temperature therein. In order to dissipate some of the power ordinarily dissipated by the series transistor 44, there is provided a shunting circuit comprising an N-type transistor 58 and an impedance 60. The transistor 58 has a collector connected to the impedance 60, and an emitter connected to the junction between the resistor 40 and the impedance 42. The base of the transistor 58 is connected to the collector of the series transistor 44. The series circuit comprising the transistor 58 and the impedance 60 is thus connected in shunt with the impedance 42 and the series transistor 44. The impedance 42 serves as a variable bias for the transistor 58 in response to current through the impedance 42.

The operation of the power supply 10, in accordance with the present invention, will now be explained. Let it be assumed that the load L has a relatively high resistance and that it draws a relatively light load current from the power supply 10. Under these conditions the voltage drop across the impedance 42 is relatively small, and the transistor 58 presents a relatively high impedance to the load current. Consequently, most of the current to the load L will flow through the series transistor 44. It is noted also, that under these conditions, the series transistor 44 can safely dissipate the power, and its temperature will be within the range of operating temperatures.

Let it now be assumed that the load L has a relatively low resistance and that the power supply now has to provide a relatively heavy load current. Without the shunt circuit comprising a transistor 58 and the impedance 60 this heavy load current may cause the series transistor 44 to rise to a temperature above its safe operating temperature. Under heavy load currents, however, the voltage across the impedance 42 causes the transistor 58 to conduct more heavily, thereby decreasing its impedance. Thus, some of the power that would normally be handled by the series transistor 44 alone, in a conventional power supply, is dissipated by the series circuit comprising the transistor 58 and the impedance 60. Under very heavy loads the transistor 58 will be driven to saturation and the impedance 60 will dissipate substantially all of the power in the shunt circuit. The series transistor 44 can now operate at a lower temperature for a given heavy load, and thereby extend the range of load current that can be supplied by the power supply 10.

It is sometimes desirable to operate the power supply 10 as a conventional regulated power supply for relatively light loads, and to provide means for dissipating a portion of the power across the series transistor 44 for heavier load currents. To this end, a diode 62 is connected in the emitter-base circuit of the transistor 58, as a Zener diode, as shown in Fig. 2. While the Zener diode 62 has its cathode connected to the base of the transistor 58 and its anode connected to the impedance 42, it is understood that the Zener diode 62 may be connected between the emitter of the transistor 58 and the impedance 42 because the impedance 42 and the Zener diodes 62 comprise a series circuit. It will now be understood that the transistor 58 will be biased to cut off until current flowing through the impedance 42 causes a voltage drop thereacross of sufficient magnitude to cause the Zener diode 62 to conduct. Under the latter conditions, the transistor 58 becomes conductive. Thus, it will be seen that the transistor 58 will remain cut off until a predetermined critical voltage is produced across the impedance 42, as by a predetermined value of load current flowing through the impedance 42. With the arrangement shown in Fig. 2, the power supply 10 may operate as a conventional series regulated power supply for loads requiring relatively light load currents. For loads requiring relatively heavy currents, above a predetermined critical amount, the transistor 58 is made conductive and serves to bypass some of the load current through the resistor 60.

The impedance 60 may be a resistor having a relatively low resistance, a few ohms, for example. It is to be noted that, without the transistor 58, a shunt of fixed resistance across the series transistor 44 would have to be greater than a predetermined minimum value because it will form a voltage divider with the load L and may cause the output voltage to be greater than a desired regulated value under certain conditions of operation. By using the shunting circuit comprising the transistor 58 and the impedance 60, the resistance of the impedance 60 may be many times smaller than it would have to be if the transistor 58 were not used. This follows when it is considered that the transistor 58 is also a variable impedance ranging from an infinite impedance when cut off to a relatively very low impedance when saturated.

What is claimed is:

1. In combination, a source of current, a pair of output terminals, a variable impedance device, a first impedance, means connecting said first impedance and said variable impedance element in series with each other and between said source and one of said pair of output terminals, means connected between said pair of output terminals and said variable impedance device to vary the impedance thereof in response to a predetermined electrical connection between said pair of output terminals, a transistor, a second impedance, means connecting said transistor in a series circuit with said second impedance, said last-mentioned circuit being connected in shunt with said variable impedance device and said first impedance, a diode, and means connecting said first impedance to said transistor through said diode.

2. In a power supply of the type wherein a source of voltage is connected to a load through a variable impedance device, and wherein regulating means control the impedance of said variable impedance device in response to a predetermined electrical condition of said load, the combination therewith of a first impedance, means connecting said first impedance in series with said variable impedance device, a transistor, a second impedance, means connecting said transistor and said second impedance in a series circuit, means connecting said last-mentioned circuit in shunt with said first impedance and said variable impedance device, a diode, and means including said diode connecting said transistor to said first impedance.

3. A power supply comprising a source of voltage, a pair of output terminals, a first impedance, a variable impedance device having a control element, means connecting said source of voltage, said first impedance and said variable impedance device in series with each other and between said pair of output terminals, means connected between said pair of output terminals and said control element to vary the impedance of said variable impedance device in response to a predetermined electrical condition between said pair of output terminals, a transistor, a second impedance, means connecting said transistor and second impedance in a series circuit, a diode, means including said diode to connect said first impedance to said transistor to control the conductivity thereof in response to current through said first impedance, and means including said last-mentioned means connecting said series circuit in shunt with said first impedance and said variable impedance device.

4. In a power supply of the type wherein a source of voltage and a variable impedance device are connected in series with each other between a pair of output terminals, and wherein means are provided for varying the impedance of said variable impedance device in response to a predetermined electrical condition between said pair of output terminals, the combination therewith of a first impedance, means connecting said first impedance in series with said variable impedance device and one of said pair of output terminals, a transistor having an emitter, a base, and a collector, a second impedance, means connecting the emitter-collector path of said transistor in a series circuit with said second impedance, a diode, means connecting said diode and said first impedance between said emitter and said base, and means including said last-mentioned means connecting said series circuit in parallel with said first impedance and said variable impedance device.

5. In a power supply of the type wherein a source of voltage and a variable impedance device are connected in series with each other between a pair of output terminals, and wherein means are provided for varying the impedance of said variable impedance device in response to a predetermined electrical condition between said pair of output terminals, the combination therewith of a first impedance, means connecting said first impedance in series with said variable impedance device and said source, a transistor having an emitter, a base, and a collector, a second impedance, means connecting the emitter-collector path of said transistor in a series circuit with said second impedance, means connecting said emitter to one end of said first impedance, a diode, means including said diode connecting said base to the other end of said first impedance, and means connecting said second impedance to said variable impedance device.

References Cited in the file of this patent

UNITED STATES PATENTS

| | | |
|---|---|---|
| 2,698,416 | Sherr | Dec. 28, 1954 |
| 2,717,353 | Sewell et al. | Sept. 6, 1955 |
| 2,751,545 | Chase | June 19, 1956 |
| 2,751,549 | Chase | June 19, 1956 |
| 2,806,198 | Fredrick | Sept. 10, 1957 |
| 2,906,941 | Brolin | Sept. 29, 1959 |